US010013372B2

(12) United States Patent
Maruyama et al.

(10) Patent No.: US 10,013,372 B2
(45) Date of Patent: Jul. 3, 2018

(54) INPUT/OUTPUT APPARATUS AND METHOD (71) Applicant: HITACHI, LTD., Tokyo (JP)

(72) Inventors: Takafumi Maruyama, Tokyo (JP); Megumu Hasegawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 16 days.

(21) Appl. No.: 15/125,997

(22) PCT Filed: Apr. 9, 2014

(86) PCT No.: PCT/JP2014/060273
§ 371 (c)(1),
(2) Date: Sep. 14, 2016

(87) PCT Pub. No.: WO2015/155850
PCT Pub. Date: Oct. 15, 2015

(65) Prior Publication Data
US 2017/0097911 A1    Apr. 6, 2017

(51) Int. Cl.
*G06F 13/36* (2006.01)
*G06F 13/28* (2006.01)
(Continued)

(52) U.S. Cl.
CPC ............ *G06F 13/28* (2013.01); *G06F 3/0608* (2013.01); *G06F 3/068* (2013.01); *G06F 3/0644* (2013.01);
(Continued)

(58) Field of Classification Search
None
See application file for complete search history.

(56) References Cited

U.S. PATENT DOCUMENTS 5,276,836 A * 1/1994 Fukumaru ........... G06F 12/0888
710/22
5,481,678 A * 1/1996 Kondo .................... G06F 13/32
710/22
(Continued)

FOREIGN PATENT DOCUMENTS

JP    2004-287654 A    10/2004
JP    2006-313478 A    11/2006
(Continued)

OTHER PUBLICATIONS

Japanese Office Action dated Jul. 4, 2017 in the Japanese Application No. 2016-512526.
(Continued)

*Primary Examiner* — Elias Mamo
(74) *Attorney, Agent, or Firm* — Volpe and Koenig, P.C.

(57) ABSTRACT

An input/output apparatus according to the present invention has an indication unit and an execution unit. The indication unit indicates that each of a plurality of data blocks between a main memory and a buffer memory is to be transferred. The execution unit transfers one data block relating to a transfer indication sent from the indication unit. After the completion of the transfer, in order to send completion information relating to the one data block to the indication unit, the execution unit determines whether transfers of all of the plurality of data blocks are completed or not based on management information for managing progresses of the transfers of the plurality of data blocks. Once determining that all of the transfers are completed, the execution unit sends, to the indication unit, total completion information showing that all of the transfers are completed.

6 Claims, 9 Drawing Sheets

(51) Int. Cl.
*G06F 3/06* (2006.01)
*G06F 5/06* (2006.01)
*G06F 13/42* (2006.01)

(52) U.S. Cl.
CPC ............ *G06F 3/0656* (2013.01); *G06F 5/065* (2013.01); *G06F 13/4282* (2013.01)

(56) References Cited

U.S. PATENT DOCUMENTS

| | | | |
|---|---|---|---|
| 6,223,236 B1 * | 4/2001 | Kori ................... | G06F 13/4027 710/120 |
| 7,185,122 B2 * | 2/2007 | Nishioka ................ | G06F 13/28 710/33 |
| 7,506,114 B2 * | 3/2009 | Haga ...................... | G06F 13/28 710/243 |
| 8,151,015 B2 * | 4/2012 | Kano ..................... | G06F 13/28 710/20 |
| 2006/0265534 A1 | 11/2006 | Haga et al. | |
| 2007/0204074 A1 | 8/2007 | Ishida et al. | |
| 2008/0147902 A1 | 6/2008 | Ishii et al. | |
| 2009/0049225 A1 | 2/2009 | Kano et al. | |
| 2012/0185634 A1 | 7/2012 | Shirai et al. | |

FOREIGN PATENT DOCUMENTS

| | | |
|---|---|---|
| JP | 2007-233522 A | 9/2007 |
| JP | 2008-146546 A | 6/2008 |
| JP | 2009-048298 A | 3/2009 |
| JP | 2012-150623 A | 8/2012 |

OTHER PUBLICATIONS

English Translation of Box No. V of the Written Opinion for International Patent Application No. PCT/JP2014/060273, 1 pgs.
Office Action in JP counterpart Application No. JP2016-512526 dated Dec. 12, 2017.

* cited by examiner

Transmission buffer management table — 300

| Transmission buffer number — 301 | Final indication flag — 302 | DMA status — 303 | | | | | | | | |
|---|---|---|---|---|---|---|---|---|---|---|
| | | DMA #0 — 304 | DMA #1 | DMA #2 | DMA #3 | DMA #4 | DMA #5 | DMA #6 | DMA #7 | ... | DMA #n |
| 0 | Completed | 1(completed) | 2(completed) | 0 | 0 | 0 | 0 | 0 | 0 | | 0 — 310a |
| 1 | Incomplete | 0 | 1(completed) | 2(incomplete) | 3(incomplete) | 0 | 0 | 0 | 0 | | 0 — 310b |
| 2 | Incomplete | 0 | 0 | 0 | 0 | 1(incomplete) | 2(incomplete) | 0 | 0 | | 0 |
| 3 | Incomplete | 0 | 0 | 0 | 0 | 0 | 0 | 0 | 0 | | 0 |
| ... | | | | | | | | | | | |

Fig. 5

| Receive buffer number | Final indication flag | DMA #0 | DMA #1 | DMA #2 | DMA #3 | DMA #4 | DMA #5 | DMA #6 | DMA #7 | ... | DMA #n |
|---|---|---|---|---|---|---|---|---|---|---|---|
| 0 | Incomplete | 0 | 0 | 0 | 0 | 0 | 0 | 0 | 0 | | 0 |
| 1 | Completed | 1(completed) | 2(completed) | 3(incomplete) | 0 | 0 | 0 | 0 | 0 | | 0 |
| 2 | Incomplete | 0 | 0 | 0 | 0 | 0 | 0 | 0 | 0 | | 0 |
| 3 | Incomplete | 0 | 0 | 0 | 0 | 0 | 0 | 0 | 0 | | 0 |
| ... | | | | | | | | | | | |

Receive buffer management table — 320
— 322 Final indication flag
— 323 DMA status
— 324
— 321 Receive buffer number
— 330a

Fig. 6

Transmitted data management table — 340

| Transmitted data number — 341 | Data size (Byte) — 342 | Memory address — 343 | Transmission buffer number — 344 | Completion flag — 345 | Frame transmission information — 346 |
|---|---|---|---|---|---|
| S0 | 1024 | 0x00200000 | 0 | Completed | Destination B, Source A, etc... |
| S1 | 1024 | 0x01200000 | 1 | Incomplete | Destination C, Source A, etc... — 350 |
| ... | — | — | — | — | |

Fig. 7

Received data management table (360)

| Received data number (361) | Data size (Byte) (362) | Memory address (363) | Receive buffer number (364) | Completion flag (365) | Frame reception information (366) |
|---|---|---|---|---|---|
| R0 | 256 | 0x00200000 | 0 | Completed | Destination A, Source B, etc... |
| R1 | — | — | — | — | — |
| ... | — | — | — | — | — |

INPUT/OUTPUT APPARATUS AND METHOD

TECHNICAL FIELD

This invention is generally concerning a technique of data input/output.

BACKGROUND ART

When a computer accesses a storage apparatus through a communication network, a protocol for bus communication within the computer can be different from a protocol for the communication network. An HBA (Host Bus Adapter) has been known as an input/output apparatus for converting these varying protocols (PTL 1).

CITATION LIST

Patent Literature

[PTL 1]
Japanese Patent Application Publication No. 2012-150623

SUMMARY OF INVENTION

Technical Problem

The size of one frame according to a protocol for a communication network is normally larger than the size of one data block according to a protocol for bus communication. The HBA stores, in one frame, a plurality of data blocks stored in a main memory of a computer and transmits the frame to a communication network, or extracts a plurality of data blocks from one frame received from the communication network and stores the plurality of data blocks in the main memory of the computer. In so doing, the HBA transfers the data between the main memory of the computer and a buffer memory in which frames are stored.

With the increase in speed of the bus communication and communication network in a computer, the data transfer described above needs to be sped up as high-speed processing by the HBA has been required.

An object of the present invention is to achieve high-speed processing of an input/output apparatus. Another object of the present invention is to achieve high-speed data transfer between a main memory of a computer and a buffer memory of the input/output apparatus.

Solution to Problem

An input/output apparatus according to one embodiment has an indication unit and an execution unit. In a case where data stored in a main memory is divided into a plurality of data blocks and the plurality of data blocks are transferred to a buffer memory or in a case where data stored in the buffer memory is divided into a plurality of data blocks and the plurality of data blocks are transferred to the main memory, the indication unit indicates that each of the plurality of data blocks is to be transferred. The execution unit executes transfers of the data blocks according to the transfer indication sent by the indication unit, and after the completion of the transfers, sends completion information to the indication unit to notify the indication unit of the completion of the transfers of the data blocks. Based on transfer management information for managing the progresses of the transfers of the plurality of data blocks, the execution unit determines whether the transfers of all of the plurality of data blocks have been completed or not and, once determining that the transfers of all of the plurality of data blocks are completed, sends total completion information to the indication unit to notify the indication unit of the completion of the transfers of all of the plurality of data blocks.

The input/output apparatus may be a conversion adapter for converting input/output data, a host bus adapter for coupling another network device or storage device to a host computer, or the like.

Advantageous Effects of Invention

The present invention can achieve high-speed processing by the input/output apparatus. The present invention can also accelerate the speed of data transfer between the main memory of a computer and the buffer memory of the input/output apparatus.

DESCRIPTION OF EMBODIMENTS

Embodiments are described hereinafter. In the following description, such a term as "xxx tables" is used to express various types of information, but these various types of information may be expressed not by data structures but by tables, etc. In order to describe that the expression of such information is not limited to the forms of data structures, "xxx tables" can be referred to as "xxx information." Also, identification information such as "numbers" and "names" are employed to explain the details of each type of information, but other forms of identification information may be used as well.

Figure 1:
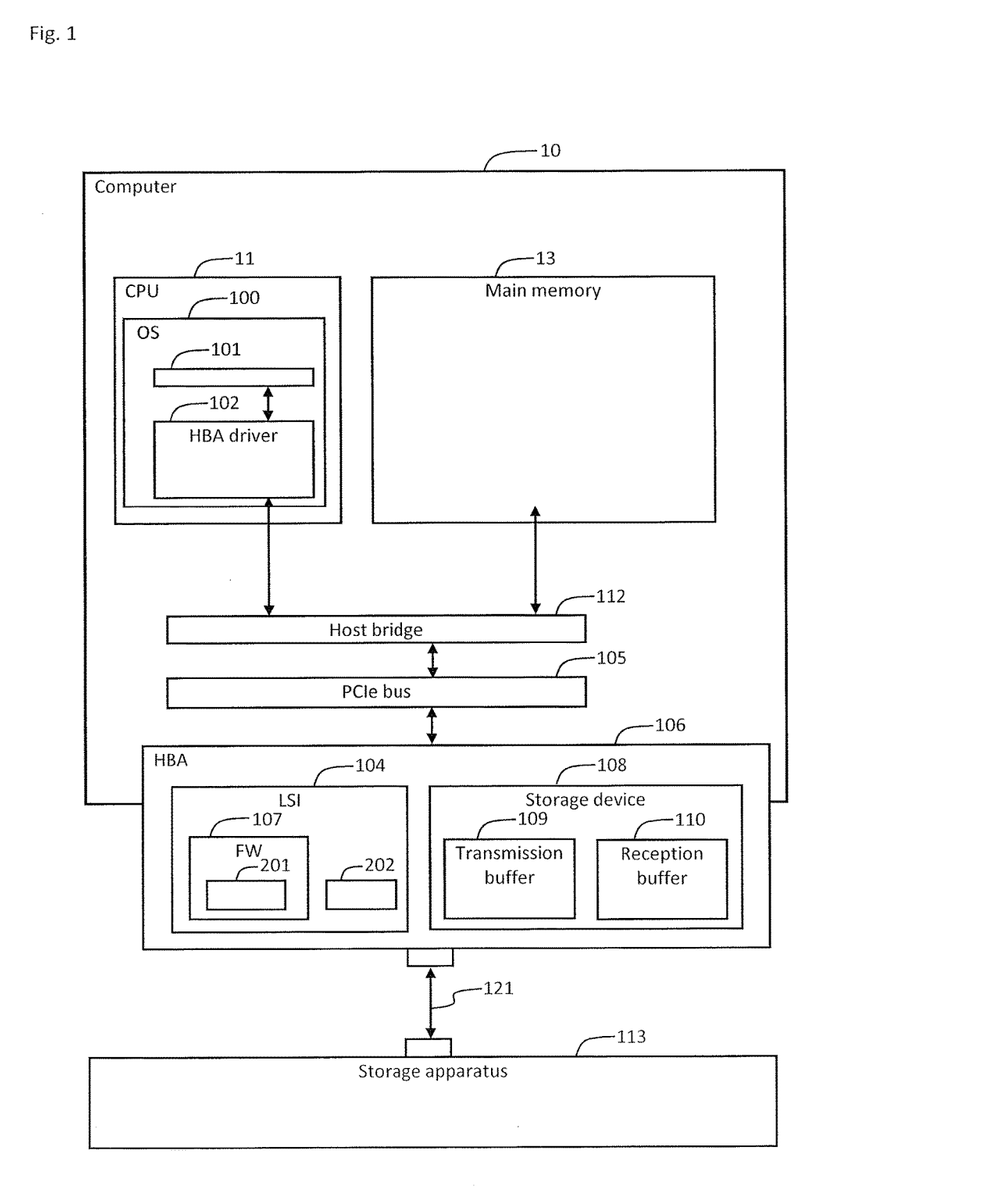
FIG. 1 shows a configuration example of a computer according to an example.

FIG. 1 shows a configuration example of a computer 10 according to the present example.

The computer 10 has a CPU (Central Processing Unit) 11, a main memory 13, a host bridge 112, a PCIe (PCI Express) bus 105, and an HBA 106. The CPU 11, the main memory 13, and the PCIe bus 105 are coupled to the host bridge 112. The HBA 106 and the host bridge 112 are coupled to the PCIe bus 105, which is a type of an internal bus. The HBA 106 and a storage apparatus 113 are coupled to each other by a SAN (Storage Area Network), which is a type of a communication network. In other words, the HBA 106 is a device for coupling the computer 10 to a Fibre Channel.

The HBA 106 has an LSI 104 and a storage device 108 and controls data transmitted through the PCIe bus 105 of the computer 10 and data transmitted through the SAN. The LSI 104 not only executes a FW 107 but also realizes various functions of the HBA 106.

The HBA 106 functions to read a data block from the main memory 13 according to a protocol for the PCIe, convert the data block into a frame according to a protocol for the SAN, and transmit the resultant frame to the storage apparatus 113. In so doing, the HBA 106 stores, in a transmission buffer 109 of the storage device 108, the data block read from the main memory 13, before converting the data block into a frame according to the protocol for the SAN.

The HBA 106 also functions to receive a frame according to the protocol for the SAN from the storage apparatus 113, convert the frame into a data block according to the protocol for the PCIe, and write the resultant data block into the main memory 13. In so doing, the HBA 106 stores, in a reception buffer 110 of the storage device 108, the frame received from the storage apparatus 113 before converting the frame into a data block according to the protocol for the PCIe.

The CPU 11 of the computer 10 executes an OS (Operating System) 100. An application program 101 and an HBA driver 102 are executed on the OS 100.

In a case where the application program 101 transmits data to the storage apparatus 113, the OS 100 stores the transmitted data in the main memory 13. Then, the HBA driver 102 indicates to the HBA 106 to DMA (Direct Memory Access)-transfer the transmitted data stored in the main memory 13 to the transmission buffer 109. In response to this indication, the HBA 106 reads a plurality of data blocks configuring the transmitted data from the main memory 13, as described above, and then DMA-transfers the data blocks to the transmission buffer 109.

In a case where the application program 101 receives data from the storage apparatus 113, the HBA driver 102 indicates to the HBA 106 to DMA-transfer the received data stored in a frame of the reception buffer 110 to the main memory 13. In response to this indication, the HBA 106 reads a plurality of data blocks configuring the received data from the reception buffer 110, as described above, and then DMA-transfers the read data blocks to the main memory 13. The OS 100 then provides the application Program 101 with the received data transferred to the main memory 13.

As the functions of the HBA 106, the function of indicating DMA transfer is expressed as "indication unit 201" and the function of executing DMA transfer as "execution unit 202" hereinafter. The indication unit 201 may be realized by a predetermined logical circuit of the FW 107 of the LSI 104 or the LSI 104. The functions of the execution unit 202 may be realized by a predetermined logical circuit of the FW 107 of the LSI 104 or the LSI 104.

For the purpose of facilitating the understanding of the characteristics of the present example, a process according to a comparative example in which the HBA transmits a frame is described first with reference to FIG. 2, and then a process according to the comparative example in which the HBA receives a frame is described with reference to FIG. 3.

Figure 2:
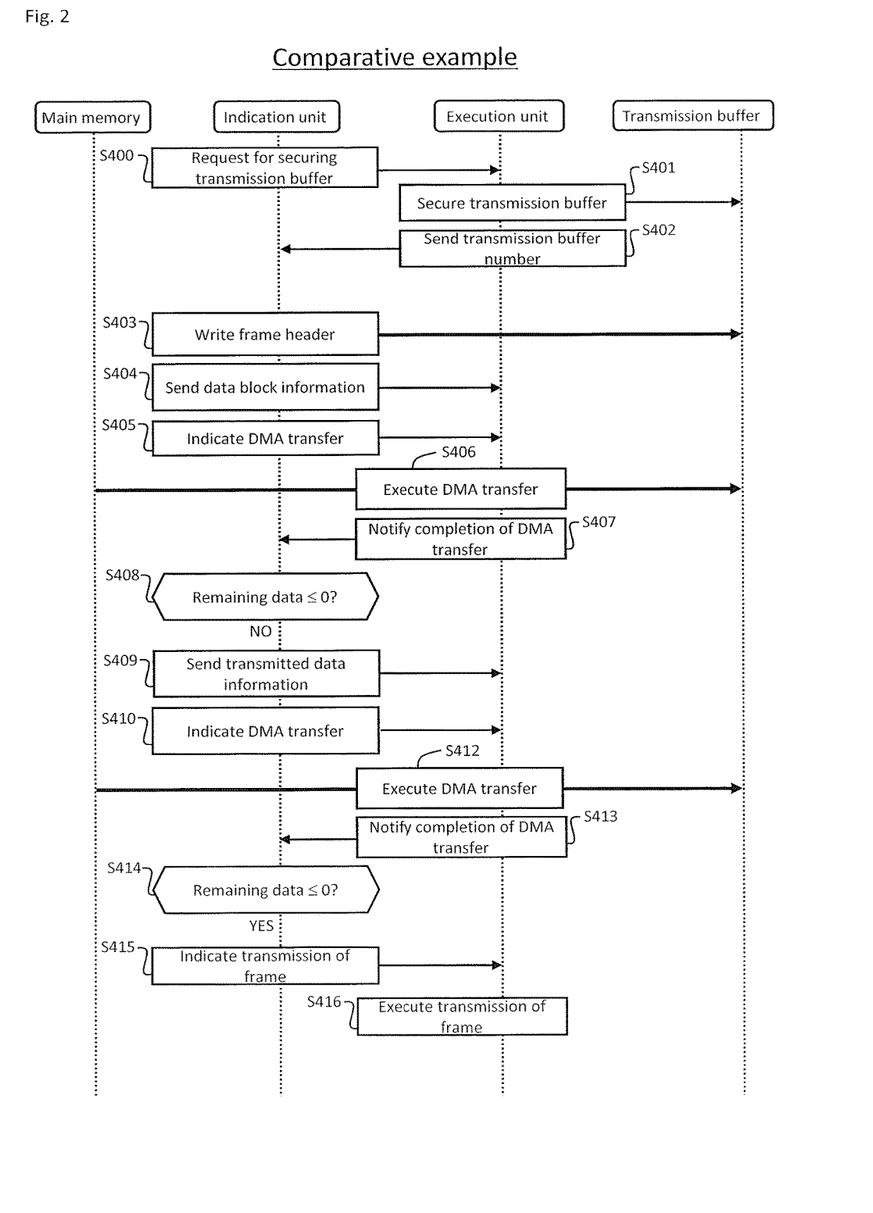
FIG. 2 is a sequence chart showing a process according to a comparative example in which an HBA transmits a frame.

FIG. 2 is a sequence chart showing the process according to the comparative example in which the HBA transmits a frame.

The indication unit requests the execution unit to secure a transmission buffer (S400).

In response to the request for securing a transmission buffer, the execution unit secures one unused transmission buffer (S401). Let it be assumed that the execution unit secures a transmission buffer having transmission buffer number "0" (described as "transmission buffer #0"). The execution unit notifies the indication unit of the completion of securing the transmission buffer #0 (S402).

In response to the notification of the completion of securing the transmission buffer #0, the indication unit creates a transmission frame header. The indication unit then writes the created transmission frame header into the transmission buffer #0 (S403). The transmission frame header contains a source address, a destination address, and the like.

The indication unit sends data block information for the first DMA transfer to the execution unit (S404). The data block information contains, for example, the size of the data block for the first DMA transfer, the address of the main memory from which the data block is read (referred to as "read destination memory address"), the number of the transmission buffer into which the data block is written ("0," in this case).

The indication unit then indicates to the execution unit to execute the DMA transfer based on the data block information sent in S404 (S405).

In response to the indication on DMA transfer sent in S405, the execution unit executes DMA transfer based on the data block information sent in S404 by using a DMA engine (S406). Specifically, the DMA engine reads a data block of the data block size from the read destination memory address contained in the data block information, and then writes the data block into the transmission buffer #0. After the completion of the DMA transfer, the execution unit notifies the indication unit of the completion of the DMA transfer (S407).

In response to the notification of the completion of the DMA transfer, the indication unit subtracts the size of the data block DMA-transferred in S406 (the size of the data block sent in S404), from the size of the transmitted data to be stored in a frame, to calculate the size of the remaining data. Then, the indication unit determines whether "the size of the remaining data ≤0" is satisfied or not (S408). In other words, the indication unit determines whether or not there remains any data block to be DMA-transferred.

When "the size of the remaining data >0" is satisfied (S408: NO), the indication unit sends data block information for second DMA transfer to the execution unit (S409). This data block information contains the size of the data block for the second DMA transfer, the read destination memory address, and the transmission buffer number "0."

The indication unit indicates the execution to perform DMA transfer based on the data block information sent in S409 (S410).

In response to the indication on DMA transfer sent in S410, the execution unit executes DMA transfer based on the data block information sent in S409 by using the DMA engine (S412). After the completion of the DMA transfer, the execution unit notifies the indication unit of the completion of the DMA transfer (S413).

In response to the notification of the completion of the DMA transfer, the indication unit subtracts the size of the data block DMA-transferred in S410 (the size of the data block sent in S409), from the size of the remaining data described above, to calculate the size of the new remaining data. Then, as in S408, the indication unit 201 determines whether "the size of the remaining data ≤0" is satisfied or not (S414).

When "the size of the remaining data ≤0" is satisfied (S414: YES), the indication unit indicates to the execution unit to transmit the frame corresponding to the transmission buffer #0 (S415). In response to this indication on transmitting the frame, the execution unit transmits the frame stored in the transmission buffer #0 that contains the frame header and the plurality of data blocks, to the storage apparatus 113 (S416).

The HBA according to this comparative example configures a frame with the transmitted data of the main memory and transmits this frame to the storage apparatus.

Figure 3:
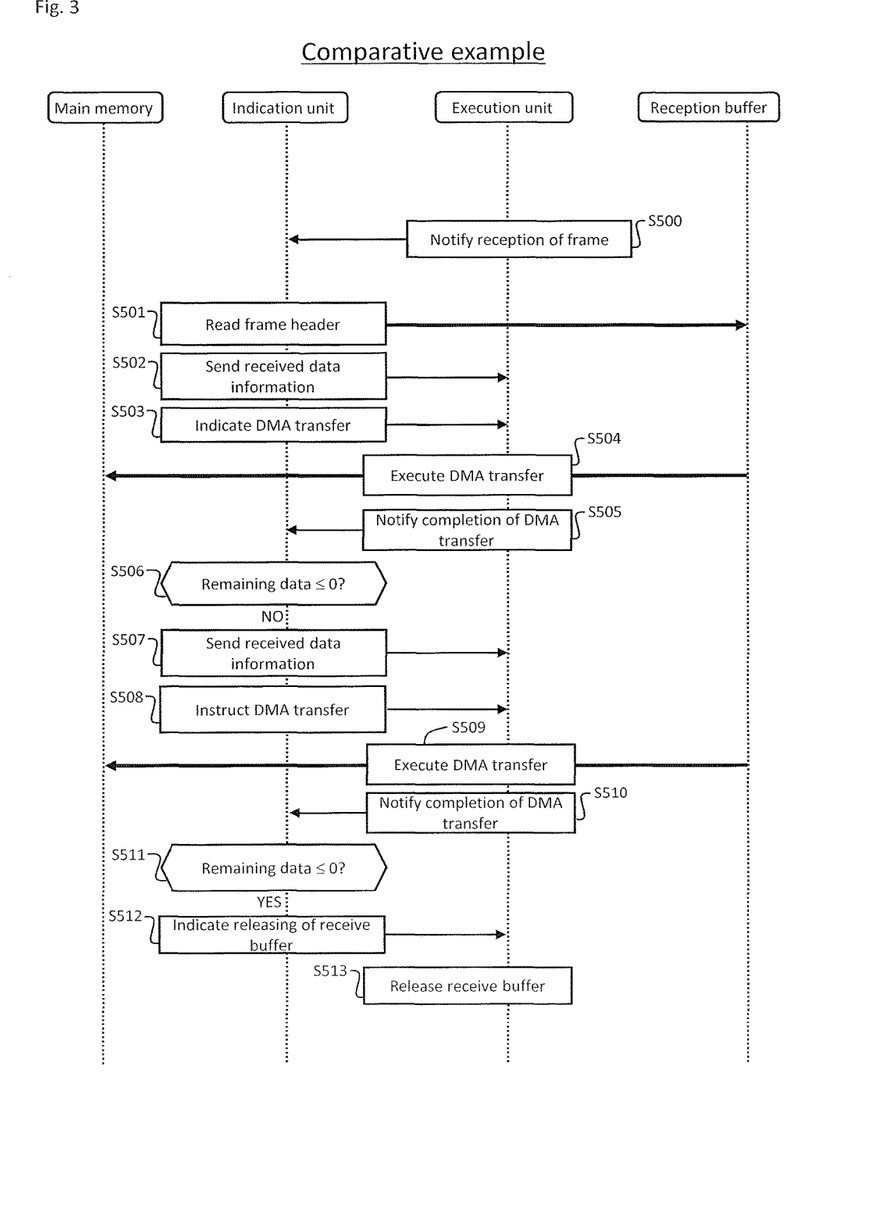
FIG. 3 is a sequence chart showing a process according to the comparative example in which the HBA receives a frame.

FIG. 3 is a sequence chart showing a process according to the comparative example in which the HBA receives a frame.

After receiving the frame from the storage apparatus, the execution unit notifies the indication unit of the reception of the frame and sends to the indication unit a reception buffer number of a reception buffer having the frame stored therein (S500). Let it be assumed that the execution unit stores a reception buffer with reception buffer number "1" ("reception buffer #1," hereinafter) in the frame.

In response to the notification of receiving the frame, the indication unit reads the frame header from the reception buffer #1 (S501). Then, based on the information on the read frame header, the indication unit creates data block information for the first DMA transfer. This data block information contains the size of the data block for the first DMA transfer, the address of the main memory into which the data block is written (referred to as "write destination memory address"), and the number of the reception buffer from which the data block is read ("1," in this case).

The indication unit sends this data block information for the first DMA transfer to the execution unit (S502). The indication unit also indicates to the execution unit to perform DMA transfer based on the data block information sent in S502 (S503).

In response to this indication on DMA transfer sent in S503, the execution unit executes DMA transfer based on the data block information sent in S502 by using the DMA engine (S504). Specifically, the DMA engine reads a data block of the data block size from the reception buffer #1, and then writes the data block into the write destination memory address of the main memory. After the completion of the DMA transfer, the execution unit notifies the indication unit of the completion of the DMA transfer (S505).

In response to the notification of the completion of the DMA transfer, the indication unit subtracts the size of the data block DMA-transferred in S504 (the size of the data block sent in S502), from the size of the received data to be stored in the frame, to calculate the size of the remaining data. Then, the indication unit determines whether "the size of the remaining data ≤0" is satisfied or not (S506). In other words, the indication unit determines whether or not there remains any data block to be DMA-transferred. When "the size of the remaining data >0" is satisfied (S506: NO), the indication unit sends data block information for the second DMA transfer to the execution unit (S507). This data block information contains the size of the data block for the second DMA transfer, the write destination memory address for the data block, and the reception buffer number "1."

The indication unit then indicates to the execution unit to perform DMA transfer based on the data block information sent in S507 (S508).

In response to this indication on DMA transfer sent in S508, the execution unit executes DMA transfer based on the data block information sent in S507 by using the DMA engine (S509). After the completion of this DMA transfer, the execution unit notifies the indication unit of the completion of the DMA transfer (S510).

In response to the notification of the completion of the DMA transfer, the indication unit subtracts the size of the data block DMA-transferred in S509 (the size of the data block sent in S507), from the size of the remaining received data described above, to calculate the size of the new remaining data. Then, as in S506, the indication unit determines whether "the size of the remaining data ≤0" is satisfied or not (S511).

When "the size of the remaining data ≤0" is satisfied (S511: YES), the indication unit indicates to the execution unit to release the reception buffer #1 (S512). In response to the indication on releasing the reception buffer #1, the execution unit releases the reception buffer #1 (S513).

In this manner, the HBA according to the comparative example extracts the received data from the received frame and stores the received data in the main memory.

In case of the HBA according to the comparative example shown in FIG. 2, the indication unit indicates DMA transfer (S405), thereafter receives the notification of the completion of the DMA transfer (S407), and then indicates subsequent DMA transfer (S410). Specifically, the HBA cannot execute the subsequent DMA transfer until one DMA transfer is completed. Therefore, in a case where the transmitted data to be stored in a frame cannot be DMA-transferred to a transmission buffer once (i.e., in a case where the data needs to be DMA-transferred multiple times), a waiting time is generated on the indication unit side, leading to degradation of the performance of the HBA.

In case of the HBA according to the comparative example shown in FIG. 3 as well, the indication unit indicates DMA transfer (S503), thereafter receives the notification of the completion of the DMA transfer (S505), and then indicates subsequent DMA transfer (S508). Specifically, the HBA cannot execute the subsequent DMA transfer until one DMA transfer is completed. Therefore, in a case where the received data to be extracted from a frame cannot be DMA-transferred to the main memory once (i.e., in a case where the data needs to be DMA-transferred multiple times), a waiting time is generated on the indication unit side, leading to degradation of the performance of the HBA.

An example of the HBA 106 for solving the foregoing problems is described hereinafter with reference to drawings.

The HBA 106 has a transmission buffer management table 300, a reception buffer management table 320, a transmitted data management table 340, and a received data management table 360. These tables may be kept in the storage device 108 or retained as registers in the LSI 104. The HBA 106 has a plurality of transmission buffers 109 and a plurality of reception buffers 110 in the storage device 108.

Figure 4:
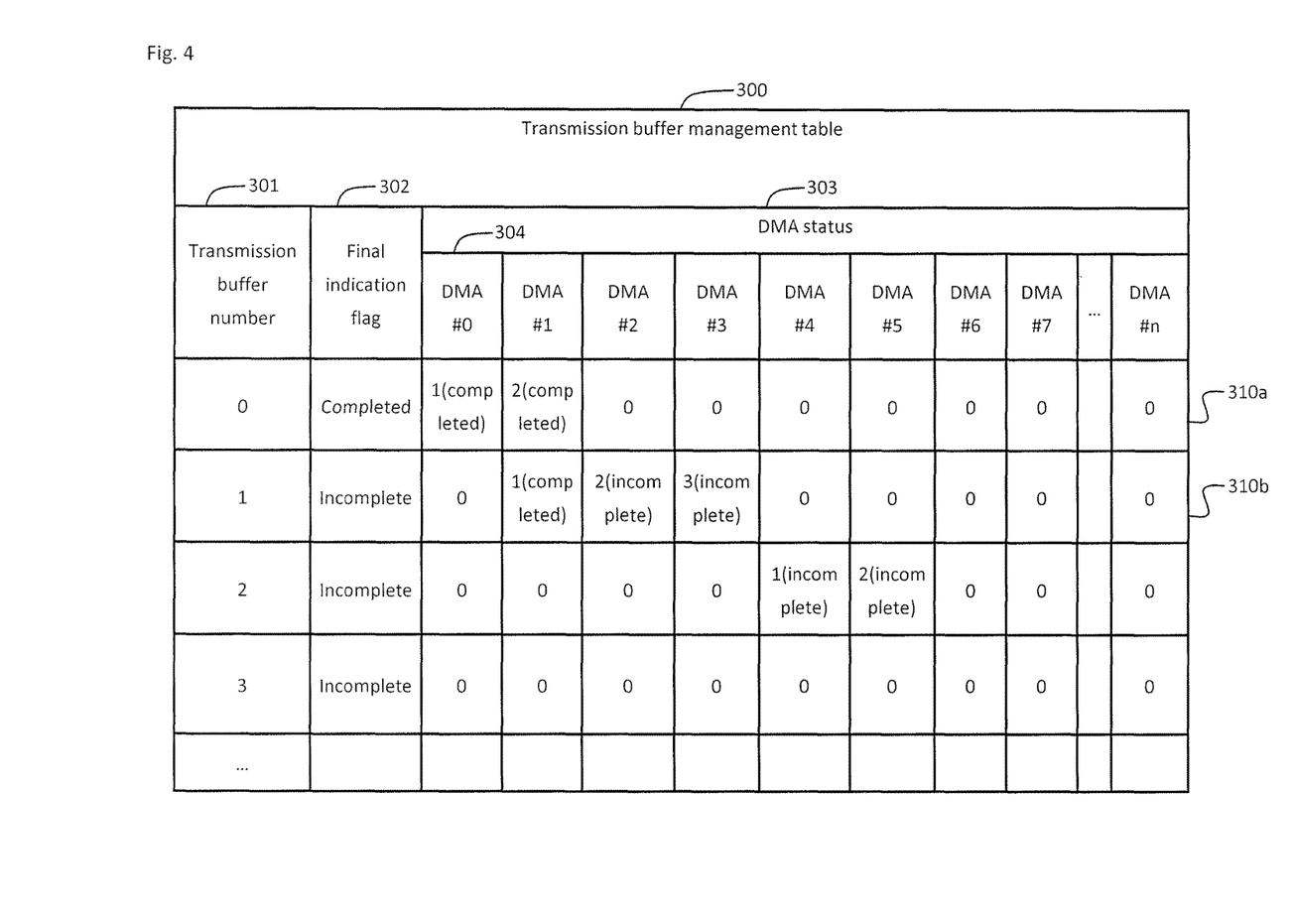
FIG. 4 shows a configuration example of a transmission buffer management table.

FIG. 4 shows a configuration example of the transmission buffer management table 300.

The transmission buffer management table 300 manages the records of transmission buffer information having information on the transmission buffers 109. The transmission buffer management table 300 has a transmission buffer number field 301, a final indication flag field 302, and a DMA status field 303.

Numbers for identifying the transmission buffers 109 are stored in the transmission buffer number field 301.

The flags that show whether a final DMA transfer indication for each of the transmission buffers 109 corresponding to the transmission buffer numbers is received or not are stored in the final indication flag field 302. For instance, the flags showing "incomplete" mean that the final DMA transfer indication is not yet received, and the flags showing "completed" mean that the final DMA transfer indication is already received.

The DMA status field 303 has a field 304 for each DMA channel. Information on the progress of DMA transfer to be executing using a relevant DMA channel is stored in the DMA channel field 304. For example, the DMA channel field 304 has stored therein a number that represents DMA transfer to be executed using a certain DMA channel out of multiple DMA transfers, and flags that show the completion of the DMA transfer. For example, the flags showing "incomplete" mean that the DMA transfer is not yet completed, and the flags showing "completed" mean that the DMA transfer is completed.

A record 310a shown in the transmission buffer management table 300 shows that DMA transfer for the transmission buffer #0 is performed after the final DMA transfer indication is received (the field 302) and that both the first DMA transfer (expressed as "DMA #0 transfer") and the second DMA #1 transfer using DMA channel "0" (expressed as "DMA #0") have been completed (the field 304).

A record 310b in the transmission buffer management table 300 shows that DMA transfer for the transmission buffer #1 is performed before the final DMA transfer indication is received (see the field 302) and that the first DMA #1 transfer is completed but both the second DMA #2 transfer and the third DMA #3 transfer are not yet completed (the field 304).

Specifically, the transmission buffer management table 300 has, for the plurality of transmission buffers, information for managing the plurality of DMA channels used for DMA transfers for the transmission buffers, and the progresses of the DMA transfers through the plurality of DMA channels used. The transmission buffer management table 300 may also have information for managing whether or not the execution unit 202 has received the final DMA transfer indication for each transmission buffer.

Figure 5:
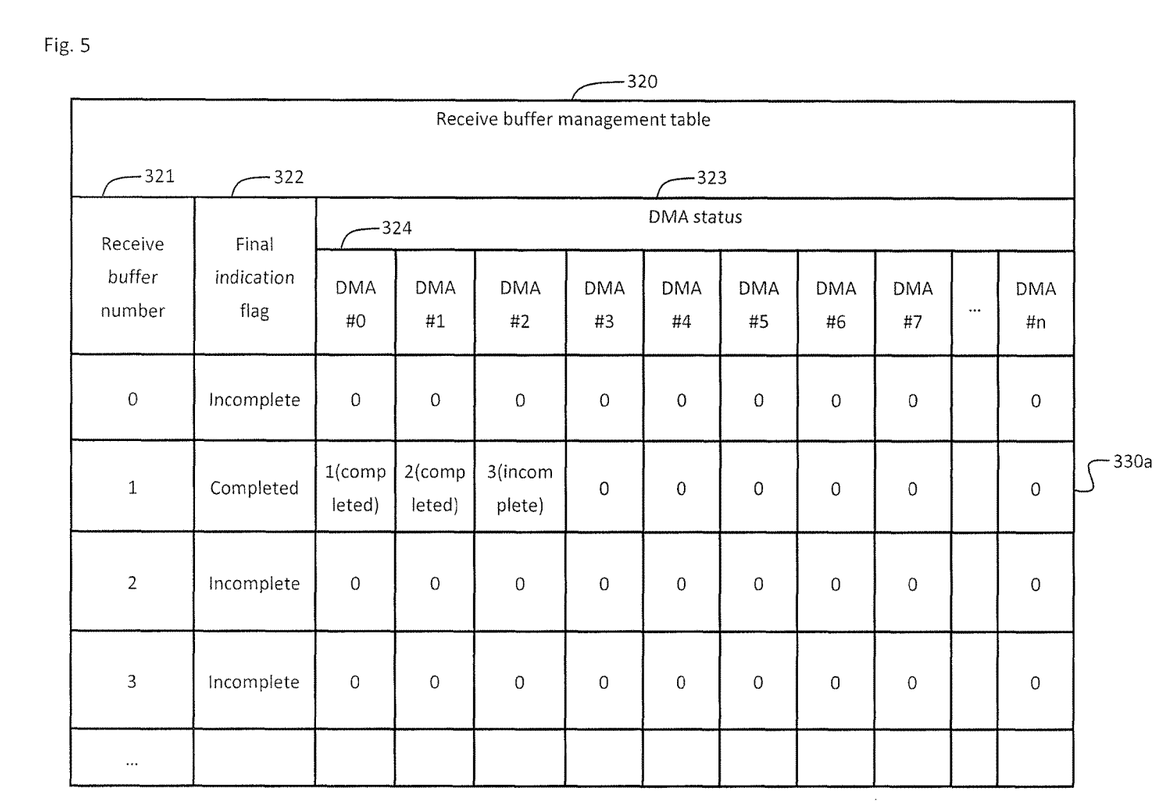
FIG. 5 shows a configuration example of a reception buffer management table.

FIG. 5 is a configuration example of the reception buffer management table 320.

The reception buffer management table 320 manages the records of reception buffer information having information on the reception buffers 110. The reception buffer management table 320 has a reception buffer number field 321, a final indication flag field 322, and a DMA status field 323.

Numbers for identifying the reception buffers 110 are stored in the reception buffer number field 321.

The flags that show whether a final DMA transfer indication for each of the reception buffers 110 corresponding to the reception buffer numbers is received or not are stored in the final indication flag field 322. For instance, the flags showing "incomplete" mean that the final DMA transfer indication is not yet received, and the flags showing "completed" mean that the final DMA transfer indication is already received.

The same information as those stored in the DMA status field 303 and the DMA channel field 304 shown in FIG. 4 are stored in the DMA status field 323 and the DMA channel field 324.

A record 330a shown in the reception buffer management table 320 shows that DMA transfer for the reception buffer #1 is performed after the final DMA transfer indication is received (the field 322), and that the first DMA #0 transfer and the second DMA #1 transfer have been completed but the third DMA #2 transfer is not yet completed (the field 324).

Specifically, the reception buffer management table 320 has, for the plurality of reception buffers, information for managing the plurality of DMA channels used for DMA transfers from the reception buffers, and the progresses of the DMA transfers through the plurality of DMA channels used. The reception buffer management table 320 may also have information for managing whether or not the execution unit 202 has received the final DMA transfer indication for each reception buffer.

Figure 6:
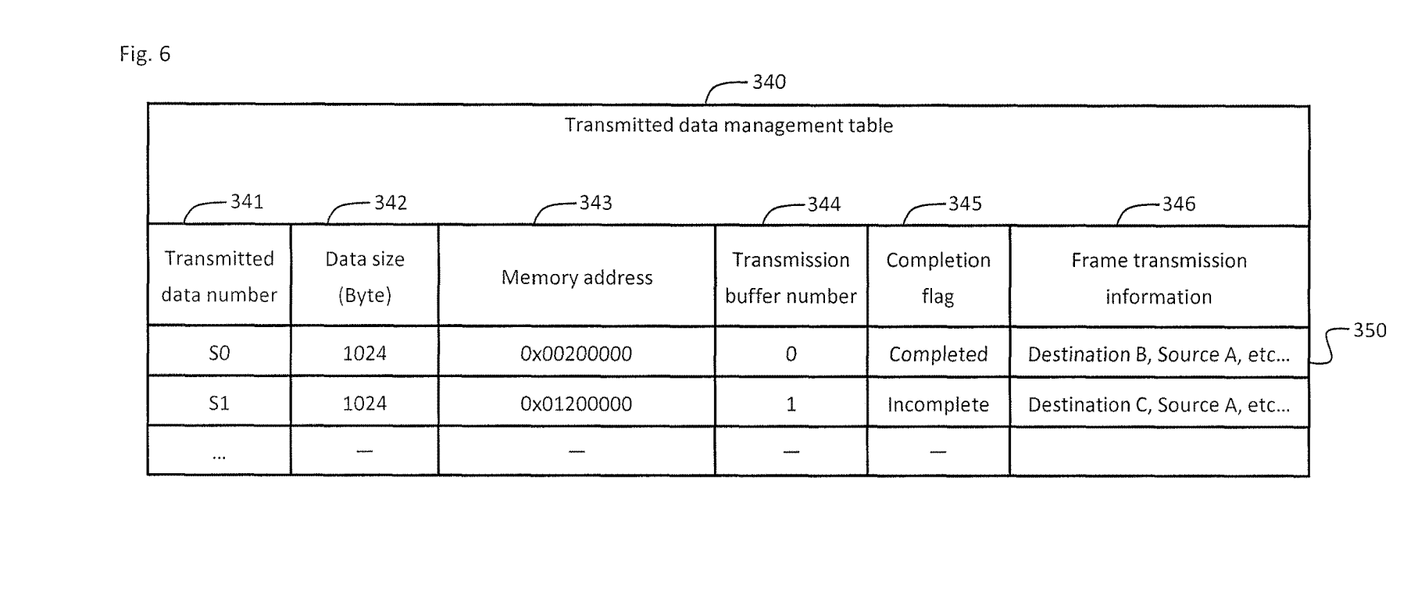
FIG. 6 shows a configuration example of a transmitted data management table.

FIG. 6 shows a configuration example of the transmitted data management table 340.

The transmitted data management table 340 manages the records of transmitted data information having information on transmitted data. The transmitted data management table 340 has a transmitted data number field 341, a data size field 342, a memory address field 343, a transmission buffer number field 344, a completion flag field 345, and a frame transmission information field 346.

Numbers for identifying the transmitted data are stored in the transmitted data number field 341. The transmitted data here are each a set of all data blocks to be stored in frames.

The size of the transmitted data is stored in the data size field 342. Specifically, the data size is the size of the set of all data blocks to be stored in a frame.

Initial addresses of the main memory 13 into which the transmitted data are stored are stored in the memory address field 343.

Transmission buffer numbers for identifying the transmission buffers 109 are stored in the transmission buffer number field 344. The transmission buffer numbers are in a correspondence relation with the transmission buffer numbers stored in the transmission buffer number field 301 of the transmission buffer management table 300.

Completion flags that show whether storage of all the transmitted data into the transmission buffers 109 has been completed or not are stored in the completion flag field 345. For example, the completion flags showing "completed" mean that storage of all the transmitted data into the transmission buffers 109 has been completed, and the completion flags showing "incomplete" mean that storage of all the transmitted data into the transmission buffers 109 is not yet completed.

Frame transmission information used for creating transmission frame headers are stored in the frame transmission information field 346. For example, the frame transmission information have destination port IDs and source port IDs according to the protocol for the SAS.

A record 350 shown in the transmitted data management table 340 shows that the transmitted data corresponding to transmitted data number "S0" (expressed as "transmitted data S0") is stored in the region corresponding to the initial address "0x00200000" of the main memory 13 and the region corresponding to "1024 Bytes" (see the fields 341, 342, and 343). The record 350 also shows that the transmitted data S0 is completely stored (the field 345) in the transmission buffer #0 (the field 344). The record 350 also shows that the transmitted data S0 is stored in a frame and transmitted to a destination B (the field 346).

Figure 7:
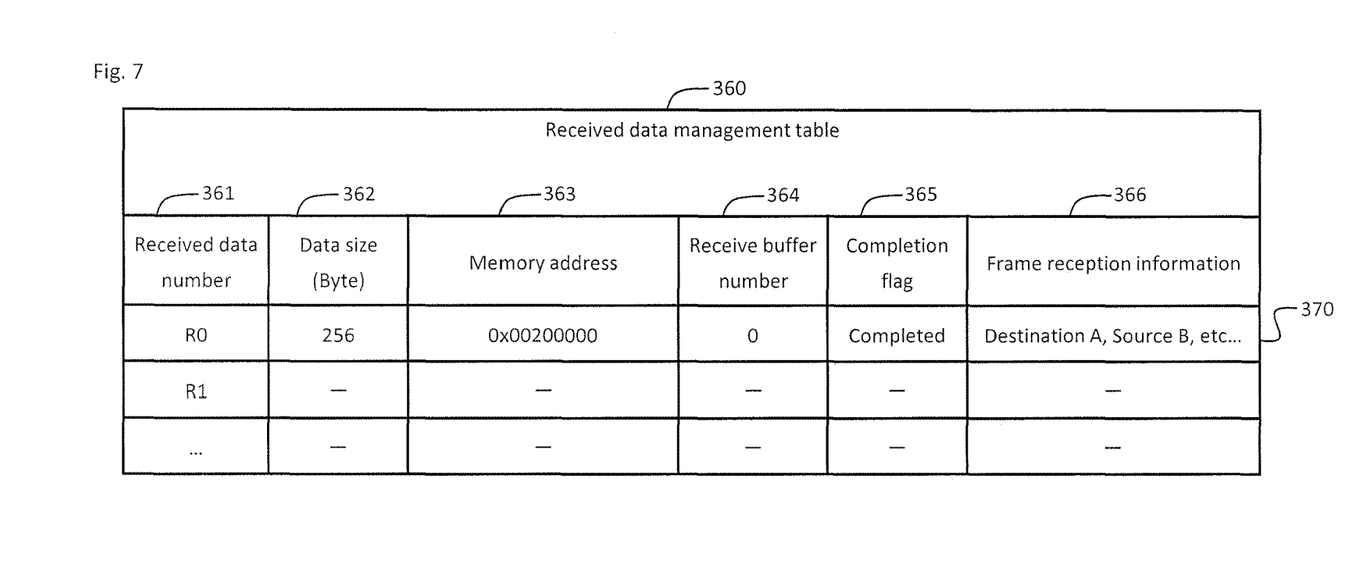
FIG. 7 shows a configuration example of a received data management table.

FIG. 7 shows a configuration example of the received data management table 360.

The received data management table 360 manages the records of received data information having information on received data. The received data management table 360 has a received data number field 361, a data size field 362, a memory address field 363, a reception buffer number field 364, a completion flag field 365, and a frame reception information field 366.

Numbers for identifying received data stored in received frames are stored in the received data number field 361. The received data here are each a set of all data blocks stored in a frame.

The sizes of the received data are stored in the data size field 362.

Initial addresses of the main memory 13 into which the received data are stored are stored in the memory address field 363.

Reception buffer numbers for identifying the reception buffers 110 are stored in the reception buffer number field 364. The reception buffer numbers are in a correspondence relation with the reception buffer numbers stored in the reception buffer number field 321 of the reception buffer management table 320.

Completion flags that show whether storage of all the received data into the main memory 13 has been completed or not are stored in the completion flag field 365. For example, the completion flags showing "completed" mean that storage of all the received data into the main memory 13 has been completed, and the completion flags showing "incomplete" mean that storage of the received data into the main memory 13 is not yet completed.

Frame reception information acquired from received frame headers are stored in the frame reception information field 366. For example, the frame reception information have destination port IDs and source port IDs according to the protocol for the SAS.

A record 370 in the received data management table 360 shows that the received data corresponding to received data number "R0" (expressed as "received data R0") has a data size of "256 Bytes" and should be written from the initial address "0x00200000" of the main memory 13. The record 370 also shows that the received data R0 is received from a source B (the field 366) and stored in a reception buffer #0 (the field 364). The record 370 also shows that the received data R0 has already been stored in the main memory 13 (the field 365).

Figure 8:
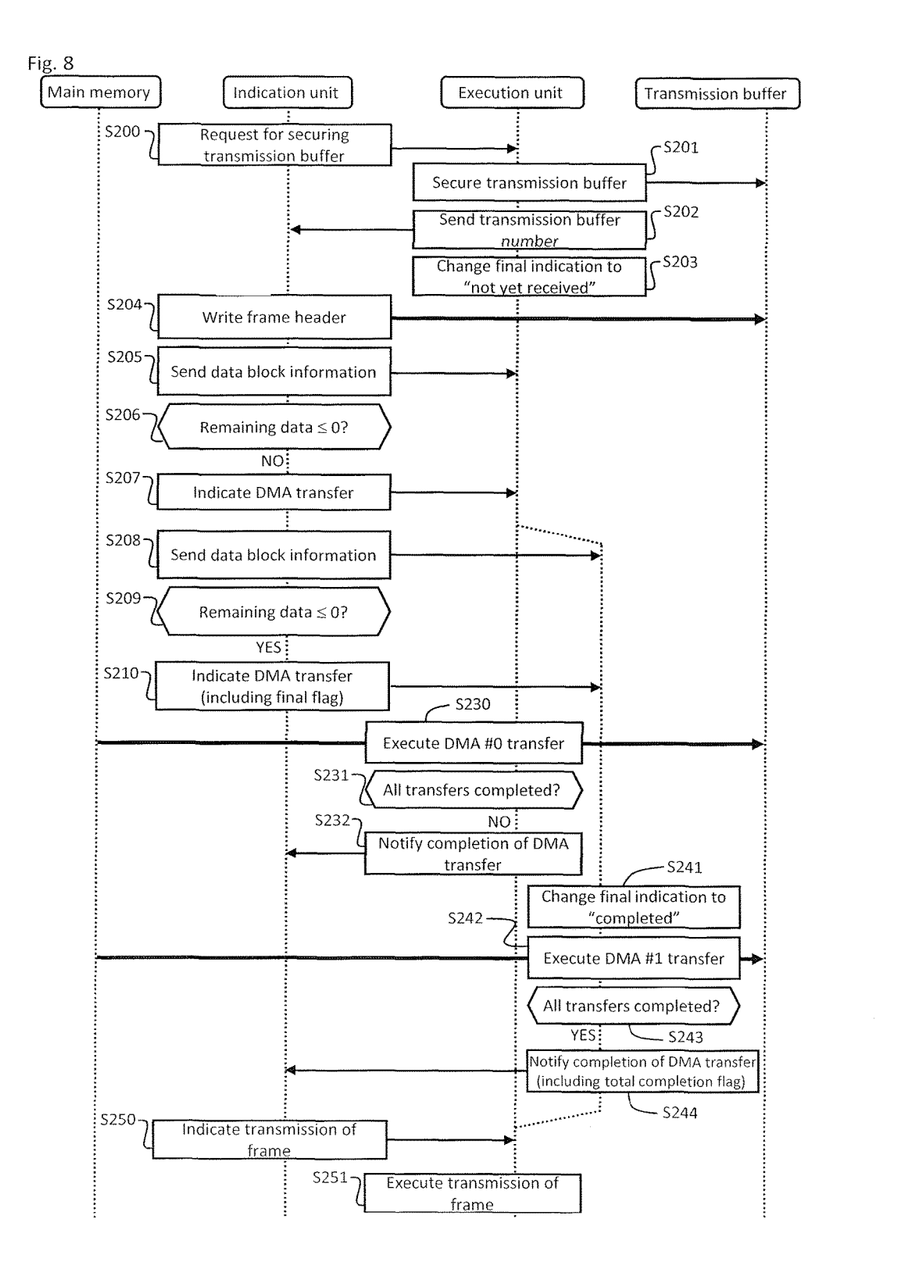
FIG. 8 is a sequence chart showing a process example in which the HBA transmits a frame to a storage apparatus.

FIG. 8 is a sequence chart showing a process example according to the present example in which the HBA 106 transmits a frame to the storage apparatus 113. The transmitted data S0 shown in the transmitted data management table 340 is described in describing the process for storing this data in a frame and transmitting the frame.

The indication unit 201 requests the execution unit 202 to secure a transmission buffer 109 (S200).

In response to the request for securing a transmission buffer 109, the execution unit 202 secures one unused transmission buffer 109 (S201). Let it be assumed that the execution unit 202 secures the transmission buffer #0. The execution unit 202 notifies the indication unit 201 of the completion of securing the transmission buffer #0 (S202). This completion notification may include the secured transmission buffer number. The execution unit 202 changes the final indication flag shown in the record corresponding to the transmission buffer #0 in the transmission buffer management table 300 to "incomplete" (S203).

In response to the notification of the completion of securing the transmission buffer #0, the indication unit 201 acquires the frame transmission information from the record 350 corresponding to the transmitted data S0 shown in the transmitted data management table 340. Based on the acquired frame transmission information, the indication unit 201 creates a transmission frame header. The indication unit 201 writes the created transmission frame header into the transmission buffer #0 (S204).

The indication unit 201 acquires the data size, memory address and transmission buffer number from the record 350 corresponding to the transmitted data S0 shown in the transmitted data management table 340. Based on the acquired data size, memory address and transmission buffer number, the indication unit 201 creates data block information for the first DMA transfer. The indication unit 201 sends this data block information for the first DMA transfer to the execution unit 202 (S205). This data block information may contain the size of the data block for the first DMA transfer, the initial address of the main memory 13 from which the data block is read, and the transmission buffer number to which the data block is transferred.

The indication unit 201 first subtracts the size of the data block sent in S205, from the size of the transmitted data to be stored in the frame (the field 342), to calculate the size of the remaining data. The indication unit 201 determines whether "the size of the remaining data ≤0" is satisfied or not (S206). Specifically, the indication unit 201 determines whether the indication on this first DMA transfer is the final indication or not.

In a case where "the size of the remaining data >0" is satisfied, i.e., in a case where this DMA transfer indication is not the final indication (S206: NO), the indication unit 201 indicates to the execution unit 202 to DMA-transfer the data block without including the final flag that shows that this DMA transfer indication is the final indication (S207). This is because more DMA transfer indications follow. Note that this DMA transfer indication corresponds to the first data block information sent in S205.

The indication unit 201 creates data block information for the second DMA transfer, and sends this data block information to the execution unit 202 (S208). This data block information main contain the size of the data block for the second DMA transfer, the initial address of the main memory 13 from which the data block is read, and the transmission buffer number to which the data block is transferred.

The indication unit 201 subtracts the size of the data block sent in S208, from the size of the remaining data calculated in S206, to calculate the size of the new remaining data. As in S206, the indication unit 201 determines whether "the size of the remaining data ≤0" is satisfied or not (S209). Specifically, the indication unit 201 determines whether the indication on this second DMA transfer is the final indication or not.

In a case where "the size of the remaining data ≤0" is satisfied, i.e., in a case where this DMA transfer indication is the final indication (S209: YES), the indication unit 201 indicates to the execution unit 202 to DMA-transfer the data block, including the final flag (S210). This is because this DMA transfer indication is the final indication. Note that this DMA transfer indication corresponds to the second data block information sent in S208.

In response to the first DMA transfer indication sent in S207, the execution unit 202 finds the record 310a of the transmission buffer #0 from the transmission buffer management table 300, based on the data block information sent in S205. The execution unit 202 secures an unused DMA channel. For instance, the execution unit 202 secures the DMA #0. The execution unit 202 changes the DMA #0 shown in the record 310a of the transmission buffer #0 to "1 (incomplete)."

Using the DMA #0, the execution unit 202 executes DMA transfer based on the data block information sent in S205 (S230). In other words, the DMA engine transfers the first data block of the main memory 13 to the transmission buffer #0 via the DMA #0. This DMA transfer using the DMA #0 is expressed as "DMA #0 transfer."

After the completion of this DMA #0 transfer, the execution unit 202 changes the DMA #0 shown in the record 310a of the transmission buffer #0 in the transmission buffer management table 300 to "1 (completed)."

The execution unit 202 determines whether the final indication flag in the record 310*a* of the transmission buffer #0 in the transmission buffer management table 300 shows "completed" or not and whether any of the DMA channels used (DMA #0) shows "completed or not (S231).

For instance, in a case where the final indication flag is "not yet received" (S231: NO), the execution unit 202 notifies the indication unit 201 of the completion of the DMA transfer without including a total completion flag that shows the completion of the DMA transfer of all data blocks to be stored in the frame (S232). Note that this notification of the completion of the DMA transfer is directed to the first DMA transfer indication sent in S207.

Concurrently with the process from S230 to S232, the execution unit 202 executes the following process from S241 to S244.

In response to the second DMA transfer indication sent in S210, the execution unit 202 recognizes that this DMA transfer indication includes a final flag. The execution unit 202 then changes the final indication flag shown in the record 310*a* of the transmission buffer #0 in the transmission buffer management table 300 to "completed" (S241).

Based on the data block information sent in S208, the execution unit 202 finds the record 310*a* corresponding to the transmission buffer #0 from the transmission buffer management table 300. The execution unit 202 secures an unused DMA channel. Since the DMA #0 is already used, the execution unit 202 secures, for example, the DMA #1. The execution unit 202 changes the DMA #1 shown in the record 310*a* of the transmission buffer #0 in the transmission buffer management table 300 to "2 (incomplete)."

Using the DMA #1, the execution unit 202 executes DMA transfer based on the data block information sent in S208 (S242). Specifically, the DMA engine transfers the second data block of the main memory 13 to the transmission buffer #0 via the DMA #1. This DMA transfer using the DMA #1 is expressed as "DMA #1 transfer."

After the completion of the DMA #1 transfer, the execution unit 202 changes the DMA #1 shown in the record 310*a* of the transmission buffer #0 in the transmission buffer management table 300 to "2 (completed)."

The execution unit 202 determines whether the final indication flag in the record 310*a* of the transmission buffer #0 in the transmission buffer management table 300 shows "received" or not and whether any of the DMA channels used (DMA #0 and DMA #1) shows "received" or not (S243).

For instance, when the final indication flag and both the DMA #0 and the DMA #1 show "received" and "completed" (S243: YES), the execution unit 202 notifies the indication unit 201 of the completion of the DMA transfers with total completion flags (S244). Note that this notification of the completion of the DMA transfers is directed to the DMA transfer indication sent in S210.

In response to the notification of the completion of the DMA transfers including the total completion flags, the indication unit 201 finds the record 350 corresponding to the transmitted data S0 from the transmitted data management table 340. The indication unit 201 then changes the completion flag of the record 350 to "completed."

The indication unit 201 indicates to the execution unit 202 to transmit the frame stored in the transmission buffer #0 (S250). In response to this indication on transmission of the frame, the execution unit 202 transmits the frame stored in the transmission buffer #0 that contain the frame header and data blocks to the storage apparatus 113 (S251).

According to the foregoing processes, the HBA 106 can simultaneously DMA-transfer a plurality of data blocks from the main memory 13 to the transmission buffers 109. In other words, unlike the HBA according to the comparative example shown in FIG. 2, the HBA according to the present example shown in FIG. 8 can indicate DMA transfer and thereafter indicate the subsequent DMA transfer without waiting for a notification of the completion of the former DMA transfer corresponding to the indication on the former DMA transfer. Therefore, unlike the HBA according to the comparative example shown in FIG. 2, the HBA 106 according to the present example shown in FIG. 8 can complete DMA transfer within a short period of time to transmit the frame.

The execution order of the notification process of S205 and the determination process of S206 in the process shown in FIG. 8 may be switched. The same is true with S208 and S209. The indication unit 201 may send a final flag separately from a final DMA transfer indication (S210). The indication unit 201 may also include a final flag in the notification of the final data block information (S208). The execution unit 202 may also send a total completion flag separately from a notification of the completion of final DMA transfer (S244).

Figure 9:
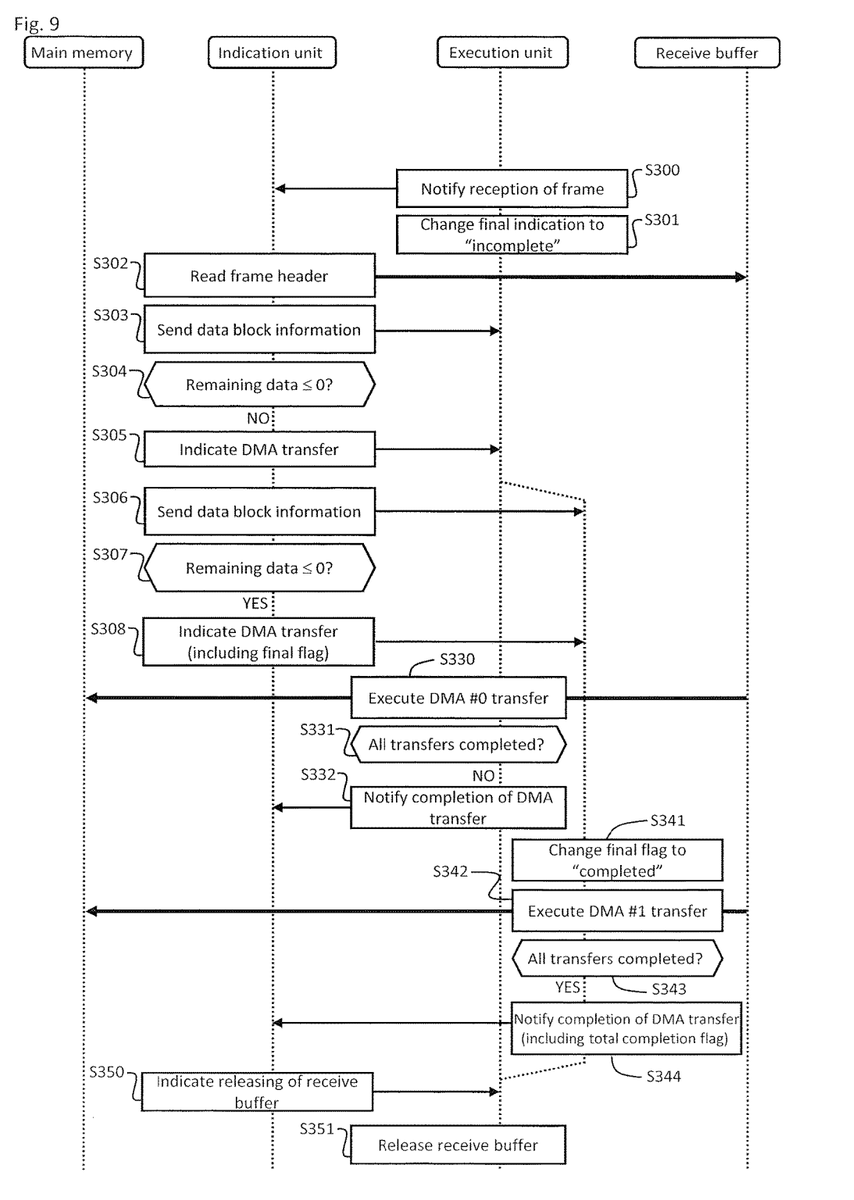
FIG. 9 is a sequence chart showing a process example in which the HBA receives a frame from the storage apparatus.

FIG. 9 is a sequence chart showing a process example according to the present example in which the HBA 106 receives a frame from the storage apparatus 113. A process for extracting the received data R0 shown in the received data management table 360 from a frame is described hereinafter.

Upon reception of a frame, the execution unit 202 notifies the indication unit of the reception of the frame and sends to the indication unit 201 the reception buffer number corresponding to the reception buffer 110 in which the frame is stored (S300). Let it be assumed that the execution unit 202 stores the reception buffer #1 in the frame.

The execution unit 202 changes the final indication flag corresponding to the record 330*a* of the reception buffer #1 in the reception buffer table 320 to "incomplete" (3301).

In response to the notification of the reception of the frame, the indication unit 201 reads the frame header from the reception buffer #1 (S302). The frame header contains, for example, the size of the received data, the source port ID and the destination port ID of the frame, and the like. The indication unit 201 determines the address of the main memory 13 in which the received data of the reception buffer #1 is stored. Based on these information, the indication unit 201 then registers the record 370 of the received data R0 in the received data management table 360.

The indication unit 201 acquires the data size, memory address and reception buffer number from the record 370 corresponding to the received data R0 in the received data management table 360. Based on the acquired data size and memory address, the indication unit 201 creates data block information for the first DMA transfer. The indication unit 201 sends this data block information for the first DMA transfer to the execution unit 202 (S303). The data block information may contain the size of the first data block, the initial address of the main memory 13 into which the data block is written, and the reception buffer number to which the data block is transferred.

The indication unit 201 first subtracts the size of the data block sent in S303, from the size of the received data stored in the frame (the field 362), to calculate the size of the remaining data. The indication unit 201 determines whether "the size of the remaining data ≤0" is satisfied or not (S304). Specifically, the indication unit 201 determines whether the indication on the first DMA transfer is the final indication or not.

In a case where "the size of the remaining data >0" is satisfied, i.e., in a case where the indication on this DMA transfer is not the final indication (S304: NO), the indication unit 201 indicates to the execution unit 202 to perform DMA transfer without including a final flag (S305). Note that this DMA transfer indication corresponds to the first data block information sent in S303.

The indication unit 201 sends data block information for the second DMA transfer to the execution unit 202 (S306). This data block information may contain the size of the data block for the second DMA transfer, the initial address of the main memory 13 into which the data block is written, and the transmission buffer number to which the data block is transferred.

The indication unit 201 subtracts the size of the data block sent in S306, from the size of the remaining data calculated in S304, to calculate the size of the new remaining data. As in S304, the indication unit 201 determines whether "the size of the remaining data ≤0" is satisfied or not (S307). Specifically, the indication unit 201 determines whether the indication on this second DMA transfer is the final indication or not.

In a case where "the size of the remaining data ≤0" is satisfied, i.e., in a case where this DMA transfer indication is the final indication (S307: YES), the indication unit 201 indicates to the execution unit 202 to perform DMA transfer including a final flag (S308). Note that this DMA transfer indication corresponds to the second data block information sent in S306.

In response to the first DMA transfer indication sent in S305, the execution unit 202 finds the record 330a of the reception buffer #1 from the reception buffer management table 320, based on the data block information sent in S303. The execution unit 202 secures an unused DMA channel. For example, the execution unit 202 secures the DMA #0. The execution unit 202 changes the DMA #0 corresponding to the record 330a of the reception buffer #1 to "1 (incomplete)."

Using the DMA #0, the execution unit 202 executes the DMA #0 transfer based on the data block information sent in S303 (S330). Specifically, the DMA engine transfers the first data block of the reception buffer #1 to the main memory 13 via the DMA #0.

After the completion of the DMA #0 transfer, the execution unit 202 changes the record 330a of the reception buffer #1 shown in the reception buffer management table 320 to "1 (completed)."

The execution unit 202 determines whether the final indication flag shown in the record 330a of the reception buffer #1 in the reception buffer management table 320 shows "completed" or not and whether any of the DMA channels used (DMA #0) shows "completed" or not (S331).

For instance, in a case where the final indication flag shows "not yet received" (S331: NO), the execution unit 220 notifies the indication unit 201 of the completion of DMA transfer without including a total completion flag (S332). Note that this DMA transfer completion notification is directed to the first DMA transfer indication sent in S305.

Concurrently with the process from S330 to S332, the execution unit 202 executes the following process from S341 to S344.

In response to the second DMA transfer indication received in S308, the execution unit 202 recognizes that this DMA transfer indication contains a final flag. The execution unit 202 then changes the final indication flag corresponding to the record 330a of the reception buffer #1 shown in the reception buffer management table 320 to "received" (S341).

Based on the data block information sent in S306, the execution unit 202 finds the record 330a of the reception buffer #1 from the reception buffer management table 320. The execution unit 202 secures an unused DMA channel. Since the DMA #0 is already used, the execution unit 202 secures, for example, the DMA #1. The execution unit 202 changes the DMA #1 corresponding to the record 330a of the reception buffer #1 shown in the reception buffer management table 320 to "2 (incomplete)".

Using the DMA #1, the execution unit 202 executes the DMA #1 transfer based on the data block information sent in S306 (S342). Specifically, the DMA engine transfers the second data block of the reception buffer #1 to the main memory 13 via the DMA #1.

After the completion of the DMA #1 transfer, the execution unit 202 changes the DMA #1 corresponding to the record 330a of the reception buffer #1 shown in the reception buffer management table 320 to "2 (completed)".

The execution unit 202 determines whether the final indication flag corresponding to the record 330a of the reception buffer #1 of the reception buffer management table 320 is "received" or not and whether any of the DMA channels used (DMA #0 and DMA #1) is "completed" or not (S343).

For instance, in a case where the final indication flag and both the DMA #0 and the DMA #1 show "completed" (S343: YES), the execution unit 202 notifies the indication unit 201 of the completion of the DMA transfers with total completion flags (S344). This notification of the completion of the DMA transfers is directed to the DMA transfer indication sent in S308.

In response to the notification of the completion of the DMA transfers including the total completion flags, the indication unit 201 founds the record 370 of the received data R0 from the received data management table 360. The indication unit 201 then changes the completion flag of the record 370 to "completed."

The indication unit 201 indicates to the execution unit 202 to release the reception buffer #1 (S350). In response to the indication on releasing the reception buffer #1, the execution unit 202 releases the reception buffer #1 (S351).

According to the foregoing processes, the HBA 106 can simultaneously DMA-transfer a plurality of data blocks from the reception buffers 110 to the main memory 13. Specifically, unlike the HBA according to the comparative example shown in FIG. 3, the HBA 106 according to the present example shown in FIG. 9 can indicate DMA transfer and thereafter indicate the subsequent DMA transfer without waiting for a notification of the completion of the former DMA transfer corresponding to the indication on the former DMA transfer. Therefore, unlike the HBA according to the comparative example shown in FIG. 3, the HBA 106 according to the present example shown in FIG. 9 can complete DMA transfer within a short period of time to release the reception buffers 110.

The execution order of the notification process of S303 and the determination process of S204 in the process shown in FIG. 9 may switched. The same is true with S306 and S307. The indication unit 201 may send a final flag separately from a final DMA transfer indication (S308). The indication unit 201 may also include the final flag in the notification of the final data block information (S306). The execution unit 202 may also send a total completion flag separately from a notification of the completion of final DMA transfer (S344).

The foregoing examples are merely explanatory purposes of the present invention and are not intended to restrict the scope of the present invention thereto. Those skilled in the art can implement the present invention in various aspects without departing from the gist of the present invention.

For instance, the HBA 106 may be a device for coupling the computer 10 to an SCSI (Small Computer System Interface), a SATA (Serial ATA), an IDE (Integrated Drive Electronics), Ethernet™, FireWire, or a USB (Universal Serial Bus), or the like.

REFERENCE SIGNS LIST

10 Computer
11 CPU
13 Main memory
105 PCI Express bus
112 Host bridge
106 HBA (Host Bus Adapter)
104 LSI
107 FW (FirmWare)
108 Storage device
109 Transmission buffer
110 Reception buffer
113 Storage apparatus
121 SAS (Serial Attached SCSI)

The invention claimed is:

1. A host bus adapter (HBA), comprising:
a Large-Scale Integration (LSI) communicatively coupled to a Storage Area Network (SAN) and a bus of a computer, wherein the LSI includes an execution logic circuit and an indication logic circuit;
a memory that stores a plurality of tables and a plurality of buffers, wherein the plurality of tables includes a transmitted data management table and a transmission buffer table;
a plurality of Direct Memory Access (DMA) channels that are each associated with at least one of the plurality of buffers
wherein the indication circuit:
acquires frame transmission information for a record from the transmitted data management table, wherein the frame transmission information includes information that identifies a plurality of data blocks to be transferred,
determines a number of DMA channels required for the record according to the frame transmission information,
creates data block information for each of the plurality of data blocks based on the number of DMA channels required, wherein the data block information includes a final flag, and
transmits, to the execution logic circuit, the data block information for each of the number of DMA channels required for the record;
wherein the execution logic circuit:
receives the data block information for each of the number of DMA channels required for the record,
reserves secured DMA channels for the number of DMA channels required from the plurality of DMA channels,
concurrently executes, using the secured DMA channels, transfers of the plurality of data blocks from the bus to buffers associated with each of the secured DMA channels based on the data block information,
updates the transmission buffer table when each of the transfers is executed, wherein a completion flag for the record is set in the transmission buffer table based on the final flag, and
transmits a frame storage message to the indication circuit when the completion flag for the record is set;
wherein the indication circuit further:
receives the frame storage message and causes the execution circuit to transmit the plurality of data blocks from the buffers associated with each of the secured DMA channels to the SAN.

2. The HBA according to claim 1, wherein the execution circuit further releases the plurality of buffers when the plurality of data blocks are transmitted to the SAN.

3. The HBA according to claim 1, wherein the execution circuit further:
transmits completion information to the indication circuit after each of the transfers.

4. The HBA according to claim 3, wherein, the completion information shows that transfers of all of data blocks corresponding to one buffer memory are completed.

5. An method for transferring data from a computer bus to a storage area network (SAN), the method comprising:
acquiring, by an indication circuit of a host bus adapter (HBA), frame transmission information for a record from a transmitted data management table stored in a memory of the HBA, wherein the frame transmission information includes information that identifies a plurality of data blocks to be transferred;
determining, by the indication circuit, a number of Direct Memory Access (DMA) channels required for the record according to the frame transmission information;
creating, by indication circuit, data block information for each of the plurality of data blocks based on the number of DMA channels required, wherein the data block information includes a final flag;
receiving, by an execution circuit of the HBA, the data block information for each of the number of DMA channels required for the record from the indication circuit;
reserving, by the execution circuit, secured DMA channels for the number of DMA channels required from a plurality of DMA channels;
concurrently executing, by the execution circuit, transfers of the plurality of data blocks from the bus to buffers associated with each of the secured DMA channels using the secured DMA channels based on the data block information;
updating, by the execution circuit, a transmission buffer table stored in the memory, HBA when each of the transfers is executed, wherein a completion flag for the record is set in the transmission buffer table based on the final flag;
receiving, by the indication circuit, a frame storage message from the execution circuit when the completion flag for the record is set; and
transmitting, by the execution circuit, the plurality of data blocks from the buffers associated with each of the secured DMA channels to the SAN in response to a message from the indication circuit.

6. A host bus adapter (HBA), comprising:
a Large-scale integration (LSI) communicatively coupled to a storage area network (SAN) and a bus of a computer, wherein the LSI includes an execution logic circuit and an indication logic circuit;

a memory that stores a plurality of tables and a plurality of buffers, wherein the plurality of tables includes a transmitted data management table and a transmission buffer table;

a plurality of DMA channels that are each associated with at least one of the plurality of buffers wherein the indication circuit:

acquires frame transmission information for a record from the transmitted data management table, wherein the frame transmission information includes information that identifies a plurality of data blocks to be transferred, determines a number of DMA channels required for the record according to the frame transmission information, creates data block information for each of the plurality of data blocks based on the number of DMA channels required, wherein the data block information includes a final flag, and transmits, to the execution logic circuit, the data block information for each of the number of DMA channels required for the record;

wherein the execution logic circuit: receives the data block information for each of the number of DMA channels required for the record, reserves secured DMA channels for the number of DMA channels required from the plurality of DMA channels, concurrently executes, using the secured DMA channels, transfers of the plurality of data blocks from the SAN to buffers associated with each of the secured DMA channels based on the data block information, updates the transmission buffer table when each of the transfers is executed, wherein a completion flag for the record is set in the transmission buffer table based on the final flag, and transmits a frame storage message to the indication circuit when the completion flag for the record is set;

wherein the indication circuit further:

receives the frame storage message and causes the execution circuit to transmit the plurality of data blocks from the buffers associated with each of the secured DMA channels to the bus.

* * * * *